United States Patent [19]

Pletz-Kirsch et al.

[11] Patent Number: 5,136,384
[45] Date of Patent: Aug. 4, 1992

[54] DIGITAL SYNCHRONIZING CIRCUIT INSENSITIVE TO NOISE IN A TV SIGNAL

[75] Inventors: Gerhard Pletz-Kirsch; Jürgen Lenth, both of Hamburg, Fed. Rep. of Germany

[73] Assignee: U.S. Philips Corporation, New York, N.Y.

[21] Appl. No.: 616,446

[22] Filed: Nov. 20, 1990

[30] Foreign Application Priority Data

Sep. 24, 1989 [DE] Fed. Rep. of Germany ....... 3938887

[51] Int. Cl.$^5$ ............................................... H04N 5/04
[52] U.S. Cl. .................................... 358/148; 358/150
[58] Field of Search ................ 358/148, 150, 153, 155

[56] References Cited

U.S. PATENT DOCUMENTS

| | | | |
|---|---|---|---|
| 4,446,482 | 5/1984 | Srivastava et al. | 358/150 |
| 4,639,780 | 1/1987 | Willis | 358/150 |
| 4,683,495 | 7/1987 | Brock | 358/153 X |
| 4,737,849 | 4/1988 | Bauduin | 358/153 X |
| 4,872,055 | 10/1989 | Teuling et al. | 358/150 X |
| 4,954,893 | 9/1990 | Urakami | 358/150 X |
| 4,996,596 | 2/1991 | Hirao et al. | 358/153 X |

Primary Examiner—Victor R. Kostak
Attorney, Agent, or Firm—Bernard Franzblau

[57] ABSTRACT

A digital synchronizing arrangement for a picture display device includes a synchronizing signal separator stage in which horizontal sync pulses are derived from a digital television signal applied to the synchronizing arrangement and which includes a horizontal synchronizing signal. A phase-locked loop receives the horizontal sync pulses for its synchronization. For the purpose of suppressing signal disturbances, a pulse of a first switching signal derived from the phase-locked loop is generated each time at the expected instants of the horizontal sync pulses. Furthermore, a pulse of a second switching signal is generated each time in a predetermined time interval after each pulse of the first switching signal. The first horizontal sync pulse which occurs during a pulse of the first switching signal is applied to the phase-locked loop, whereas horizontal sync pulses subsequently occurring in the interval until the next pulse of the second switching signal are not applied to the phase-locked loop. All horizontal sync pulses subsequently occurring until the next pulse of the first switching signal are applied to the phase-locked loop if no horizontal sync pulse appeared during the pulse of the first switching signal.

13 Claims, 3 Drawing Sheets

DIGITAL SYNCHRONIZING CIRCUIT INSENSITIVE TO NOISE IN A TV SIGNAL

BACKGROUND OF THE INVENTION

This invention relates to a digital synchronizing arrangement for picture display device, comprising a synchronizing signal separator stage in which horizontal sync pulses are derived from a digital television signal applied to the synchronizing arrangement and comprising a horizontal synchronizing signal, and a phase-locked loop to which the horizontal sync pulses are applied for its synchronization.

Synchronizing arrangements of this type generally present the problem that the horizontal synchronizing signal can no longer be identified correctly when the input signal is distrubed and that consequently erroneous or no horizontal sync pulses are generated. This in turn results in the phase-locked loop being out of step so that a distorted picture is displayed. The same applies when there are phase jumps in the television signal.

An analog horizontal synchronizing arrangement is known from U.S. Pat. No. 3,819,859 in which a so-called window is employed to recognize the pulses included in the horizontal synchronizing signal. Dependent on the detected pulses in the horizontal synchronizing signal, this window is opened and closed again. In the time interval in which the window is opened all pulses exceeding a given threshold are evaluated as sync pulses. When the signal is distrubed, a plurality of pulses may thus be detected within one window. Moreover, problems with television signals which have phase jumps occur in this arrangement because no pulses in the horizontal synchronizing signal may then be recognized within the window. A subsequently arranged phase-locked loop will then be out of step.

SUMMARY OF THE INVENTION

It is an object of the invention to provide a digital synchronizing arrangement of the type described in the opening paragraph which also ensures a reliable synchronization when the television signal is disturbed or beset with noise.

According to the invention this object is achieved in that each time a pulse of a first switching signal derived from the phase-locked loop is generated at the expected instants of the horizontal sync pulses, and of a width to detect the horizontal sync pulse in that each time a pulse of a second switching signal is generated at a predetermined time interval after each pulse of the first switching signal, in that the first horizontal sync pulse which occurs during a pulse of the first switching signal is applied to the phase-locked loop, whereas horizontal sync pulses subsequently occurring until the next pulse of the second switching signal are not applied, and in that all horizontal sync pulses subsequently occurring until the next pulse of the first switching signal are applied to the phase-locked loop if no horizontal sync pulse were to occur during a pulse of the first switching signal.

In the horizontal sync pulse-synchronized state of the phase-locked loop, this loop supplies output signals which are in a defined phase relation to the horizontal sync pulses and which can be employed in known manner, for example, for a deflection unit of a picture display device. Thus there is a fixed relation with respect to the time between the output signals of the phase-locked loop and the horizontal sync pulses. It is therefore possible to generate a pulse which occurs exactly at the instants when a horizontal sync pulse is expected, because these instants are known in the steady-state condition of the phase-locked loop. Moreover, this pulse can be generated in such a width that it has approximately the width of the horizontal sync pulses. These pulses thus generated constitute a first switching signal.

In addition, a second switching signal is generated which supplies a pulse at the predetermined time interval after each pulse of the first switching signal. This second switching signal may be generated, for example, by means of time a delay of the first switching signal or, in the same way as the first switching signal, derived from signals of the phase-locked loop.

These two switching signals are employed to check the detected horizontal sync pulses for disturbances and to suppress possibly unwanted pulses. This is effected in such a way that during a pulse of the first switching signal it is first determined whether a horizontal sync pulse occurs. If this is the case in this period, the pulse is applied to the phase-locked loop. All horizontal sync pulses occurring after this pulse of the first switching signal but before the next pulse of the second switching signal are blocked, i.e. they are not applied to the phase-locked loop. In this way it is ensured that in the period between the leading edge of the pulse of the first switching signal and the leading edge of the pulse of the second switching signal exactly one horizontal sync pulse is passed on to the phase-locked loop. Thus, even when a plurality of horizontal sync pulses is erroneously detected in a blanking interval, only the first pulse is passed on to the phase-locked loop in the case of a disturbed or a very noisy television signal.

If no horizontal sync pulse occurs during the period of a pulse of the first switching signal, all horizontal sync pulses subsequently occurring until the leading edge of the next pulse of the first switching signal are applied to the phase-locked loop. Upon commencement of the next pulse of the first switching signal it is then again checked whether a horizontal sync pulse occurs during the pulse. If this should be the case, the horizontal sync pulses are blocked after this pulse until the next pulse of the first switching signal. Otherwise, all horizontal sync pulses are passed on to the phase-locked loop until the next pulse of the first switching signal.

As compared with the known arrangement, this synchronizing arrangement has the particular advantage that only exactly one pulse is passed on to the phase-locked loop within a window which in this case is constituted by the leading edges of the pulses of the first switching signal and the leading edges of the pulses of the second switching signal. A further advantage is that in the case of a strongly disturbed signal or one with phase jumps, which particularly occur when television signals are displayed by video recorders, the arrangement is still capable of performing a faultless synchronization because horizontal sync pulses which no longer occur during the period of the pulse of the first switching signal are nevertheless passed on to the phase-locked loop, even if the window was already closed, i.e. when the pulse of the second switching signal has already occurred.

Thus in the normal case, i.e. when the phase-locked loop is correctly synchronized on the television signal and the horizontal synchronizing signal included in this television signal and when this signal is undistrubed, the arrangement is capable of ensuring a faultless synchronization because only exactly one horizontal sync pulse is passed on to the phase-locked loop. If these conditions are not fulfilled, all horizontal sync pulses occurring between two pulses of the first switching signal are passed on to the phase-locked loop so as to enable its synchronization.

According to a further embodiment of the invention the horizontal sync pulses are applied to a first input of a first AND gate and to a first input of a second AND gate whose second input receives the first switching signal and whose output is connected to the reset input of an RS flip-flop whose set input receives the second switching signal and whose output is connected to the second input of the first AND gate whose output signal is applied to the phase-locked loop.

The second AND gate supplies an output signal when a horizontal sync pulse occurs during a pulse of the first switching signal. The RS flip-flop is then reset, whereupon the first AND gate blocks possibly occurring horizontal sync pulses. This blocking action is discontinued when a pulse of the second switching signal occurs by which the RS flip-flop is set again so that blocking by the first AND gate is discontinued. With this simple structure the circuit can be easily integrated.

According to a further embodiment of the invention the first input of the first AND gate as well as the input of the phase-locked loop are preceded by registers each of which is clocked with the scanning clock of the television signal.

Since delay times occur in the gates and the flip-flops, it is advantageous in many applications for scanning clock-synchronous processing operations to provide these two registers which restore the synchronization with the scanning clock.

According to a further embodiment of the invention the two switching signals are generated by means of a counter arranged in the phase comparator of the phase-locked loop, which counter is clocked with the scanning clocks of the television signal and is synchronized on the horizontal sync pulses in the synchronized state of the phase-locked loop.

Phase-locked loops which are implemented completely in a digital technique generally comprise phase comparators which include counters. In such phase comparators the counter is used to check during given counts whether the phase-locked loop is correctly synchronized with the input signal. The input signal is then to occur during given counts. As the count of this counter in the synchronized state of the phase-locked loop is in a fixed relation to the occurring pulses, the count can be simultaneously utilized to generate the two switching signals at the desired instants and with the desired duration. No additional equipment is then required for generating the two switching signals.

According to a further embodiment of the invention the predetermined time interval between each pulse of the second switching signal and the previous pulse of the first switching signal is 50 to 75 $\mu$sec. For television signals this time interval between the pulse of the second signal and the leading edge of the previous pulse of the first switching signal has proved to be advantageous, because disturbing pulses are satisfactorily blanked in this way. On the other hand the blocking operation is not performed for such a long time that it is no longer possible to realise a reliable synchronization.

BRIEF DESCRIPTION OF THE DRAWING

The invention will now be described in greater detail with reference to the accompanying drawings, in which.

DESCRIPTION OF THE PREFERRED EMBODIMENTS

Figure 1:
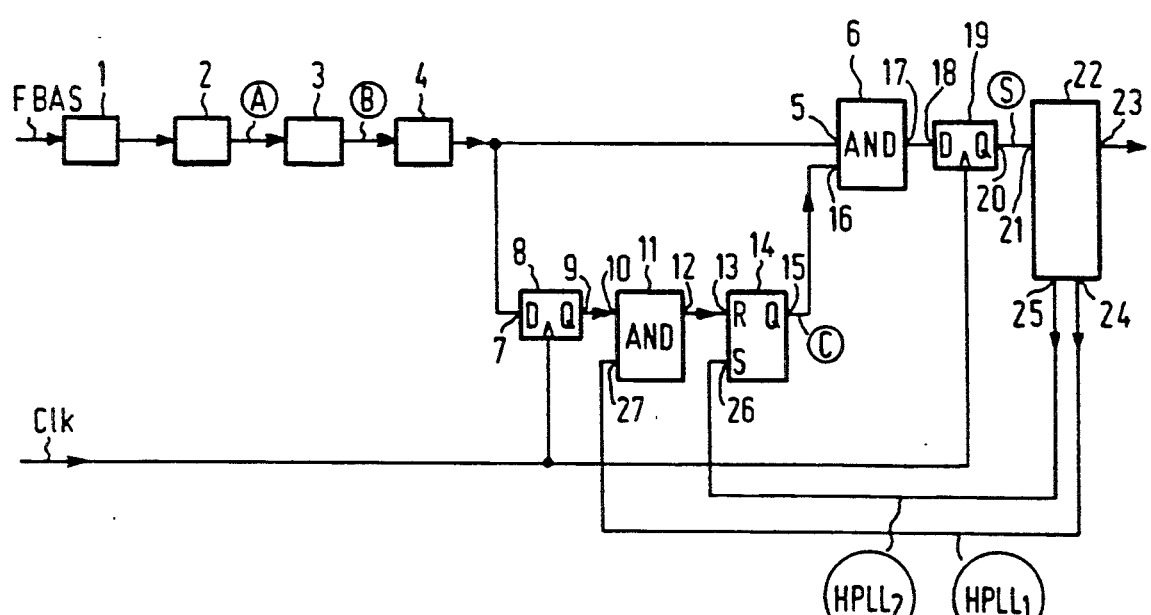
FIG. 1 is a block diagram of a digital synchronizing arrangement.

A digital synchronizing arrangement shown in FIG. 1 has at its input end a synchronizing signal separator stage which comprises a low-pass filter 1 and a clipping level comparator 2. A television signal comprising a horizontal synchronizing signal is applied to the low-pass filter 1. The comparator 2 succeeds the low-pass filter and is used for comparing the signal supplied by the low-pass filter with a clipping level. In this way the horizontal sync pulses are separated from the other television signal in the comparator. These pulses thus separated are then applied to a counter 3 which generates pulses of a defined width. These pulses of a defined width, which represent the horizontal sync pulses, are applied to a slope detector 4. The output signal of the slope detector 4 is applied to a first input 5 of a first AND gate 6 and to an input 7 of a register 8. The register 8 is clocked by means of a clock signal Clk. An output 9 of the register 8 is connected to a first input 10 of a second AND gate 11 having an output 12 connected to the reset input 13 of an RS flip-flop 14. An output 15 of the RS flip-flop is connected to a second input 16 of the first AND gate 6. An output 17 of the first AND gate is connected to an input 18 of a register 19 which, like the register 8, is clocked by means of a clock signal Clk. An output 20 of the register 19 is connected to an input 21 of a phase-locked loop 22 which is only shown diagrammatically in the Figure. The output 23 of the phase-locked loop 22 supplies a signal which may be applied, for example, to a horizontal deflection unit of a picture display device which is not shown in the Figure. The elements, 6, 8, 11, 14 and 19 comprise a gate circuit that includes a first AND gate 6 and a logic circuit including elements 8, 11 and 14 with the output 15 of the logic circuit coupled to the second input 16 of the first AND gate.

In dependence upon the signals appearing at the output 23, a first switching signal appearing at an output 24 of the phase-locked loop 22 as well as a second switching signal appearing at a further output 25 of the phase-locked loop are generated. The output 24 of the phase-locked loop 22 is connected to a second input 27 of the second AND gate 11. The output 25 of the phase-locked loop 22 is connected to a set input 26 of the RS flip-flop 14.

The operation of the synchronizing arrangement shown in FIG. 1 will be described in greater detail with reference to the pulse diagram shown in FIG. 2.

Figure 2:
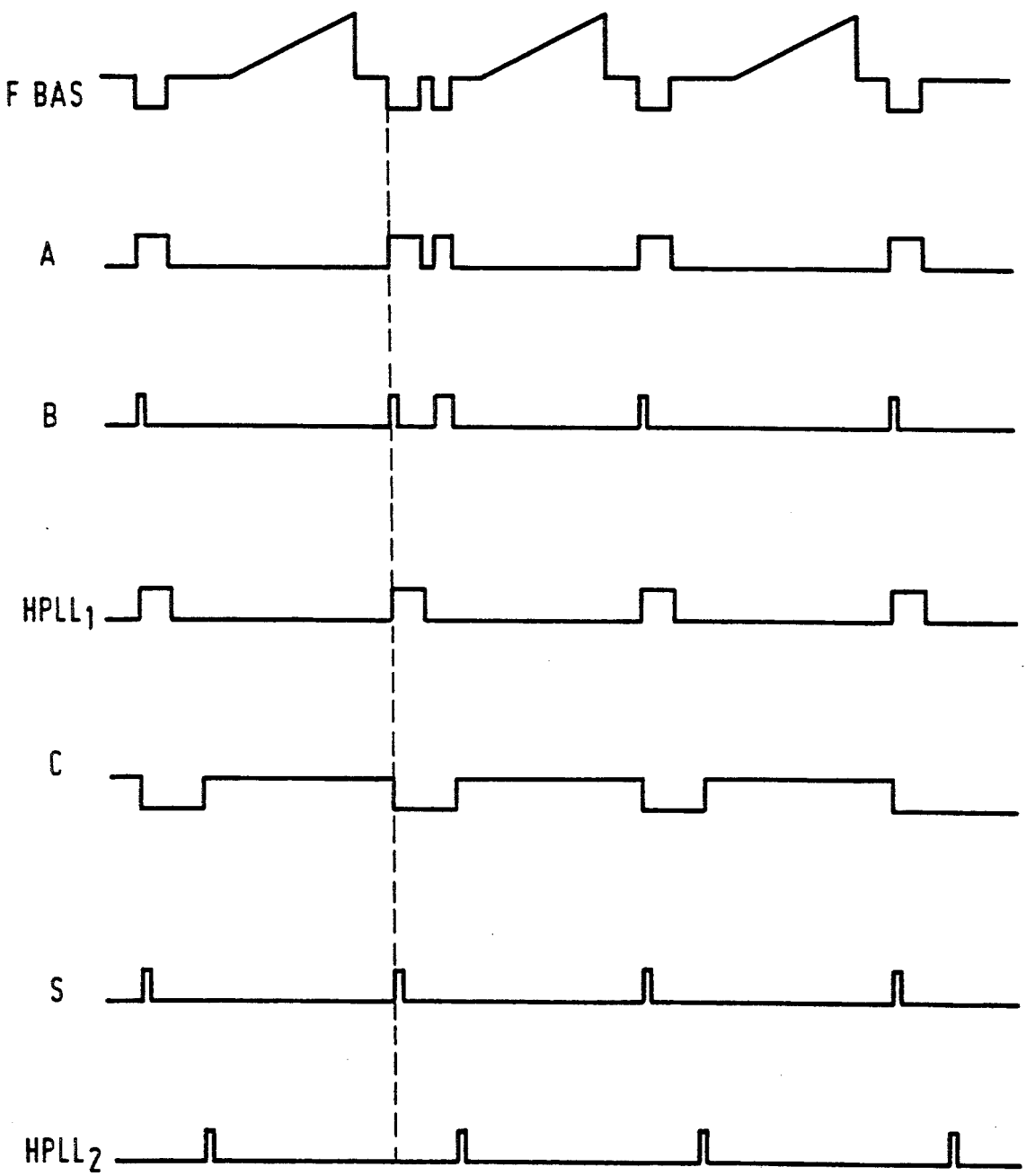
FIG. 2 is a pulse diagram of the synchronizing arrangement according to FIG. 1 for a disturbed television signal.

A characteristic curve denoted by FBAS in FIG. 2 represents the input signal which is applied to the low-pass filter 1. It is the complete television signal which comprises four horizontal sync pulses as well as the intermediate active picture information in the time interval shown. In the example shown in FIG. 2 the horizontal synchronizing signal is disturbed in the second blanking interval.

A characteristic curve A shown in FIG. 2 shows the output signal of the comparator 2 in which the FBAS signal is compared with a fixed clipping level and in which pulses from the horizontal synchronizing signal are generated. In the characteristic curve of the signal A shown in the Figure, it can already be seen that two pulses are generated in the second blanking interval.

A characteristic curve B shown in FIG. 2 shows the output signal of the counter 3 in which pulses of a defined width are generated. These are the horizontal sync pulses. In the second blanking interval of the time interval shown in FIG. 2 two horizontal sync pulses are generated on the basis of the disturbed FBAS signal.

The phase-locked loop 22 shown in FIG. 1 supplies a first switching signal which is denoted by $HPLL_1$ in FIG. 2. This first switching signal each time supplies a pulse exactly when horizontal sync pulses are expected. In fact, if the phase-locked loop is correctly synchronized on the television signal FBAS, the phase-locked loop is capable of generating a pulse of the first switching signal exactly at the instants when a horizontal sync pulse is expected in the synchronizing signal. Since the width of the pulses in the horizontal synchronizing signal is known, the pulses of the first switching signal can be generated with the same width. Each time a pulse of a second switching signal, denoted by $HPLL_2$ in FIG. 2, is generated at a defined time interval after a pulse of the first switching signal.

When the television signal is undisturbed, as is the case in the example shown in FIG. 2 in the first blanking interval, a horizontal sync pulse in accordance with characteristic curve B occurs simultaneously with a pulse of the first switching signal $HPLL_1$. These two signals, which are applied to the AND gate 11, result in the flip-flop 14 being reset. The output signal of the flip-flop 14 is shown in the characteristic curve C. While this output signal C of the flip-flop has a low level, the AND gate 6 is inhibited so that no further horizontal sync pulse can reach the phase-locked loop 22. The horizontal sync pulse which has occurred during the period of the pulse of the first switching signal $HPLL_1$ can still pass the AND gate 6 and be read in the register 19 because the gate 11 and the flip-flop 14 have delay times. Moreover, in this embodiment the pulse is applied to the second AND gate 11 with a delay of one clock performed in the register 8. Thus the flip-flop 14 will also be reset one clock later and the AND gate 6 will be inhibited one clock after the horizontal sync pulse has occurred. A pulse which is applied to the phase-locked loop and is denoted by S in FIG. 2 then appears at the output of the register 19.

The above-described procedure in the case of an undisturbed input signal and as shown, for example in the time interval during the first blanking interval in FIG. 2, results in that the AND gate 6 does not pass on any further horizontal sync pulses to the register 19 or to the phase-locked loop 22 when a horizontal sync pulse occurs during one pulse of the first switching signal $HPLL_1$ until the occurrence of the second switching signal $HPLL_2$.

This will be further explained with reference to the second blanking interval shown in the characteristic curves of FIG. 2. In this blanking interval a further horizontal sync pulse occurs after the first pulse. However, this second horizontal sync pulse occurs before the leading edge of the second switching signal $HPLL_2$, thus before the RS flip-flop is set by means of this signal. The result is that the AND gate 6 is inhibited because the output signal C of the RS flip-flop still has a low level. The second horizontal sync pulse within the second blanking interval thus does not reach the register 19 and the subsequently arranged phase-locked loop 22. This second horizontal sync pulse, which is nothing more than a disturbing pulse, is thus completely blanked.

The digital synchronizing arrangement shown in FIG. 1 has the additional advantage that it is not blocked despite the creation of windows in the case of phase jumps of the television signal, but passes on the horizontal sync pulse to the phase-locked loop, even when these pulses are outside the window, i.e. outside the time interval between the pulses of the first and the second switching signal. This will be further described with reference to the pulse diagram shown in FIG. 3.

Figure 3:
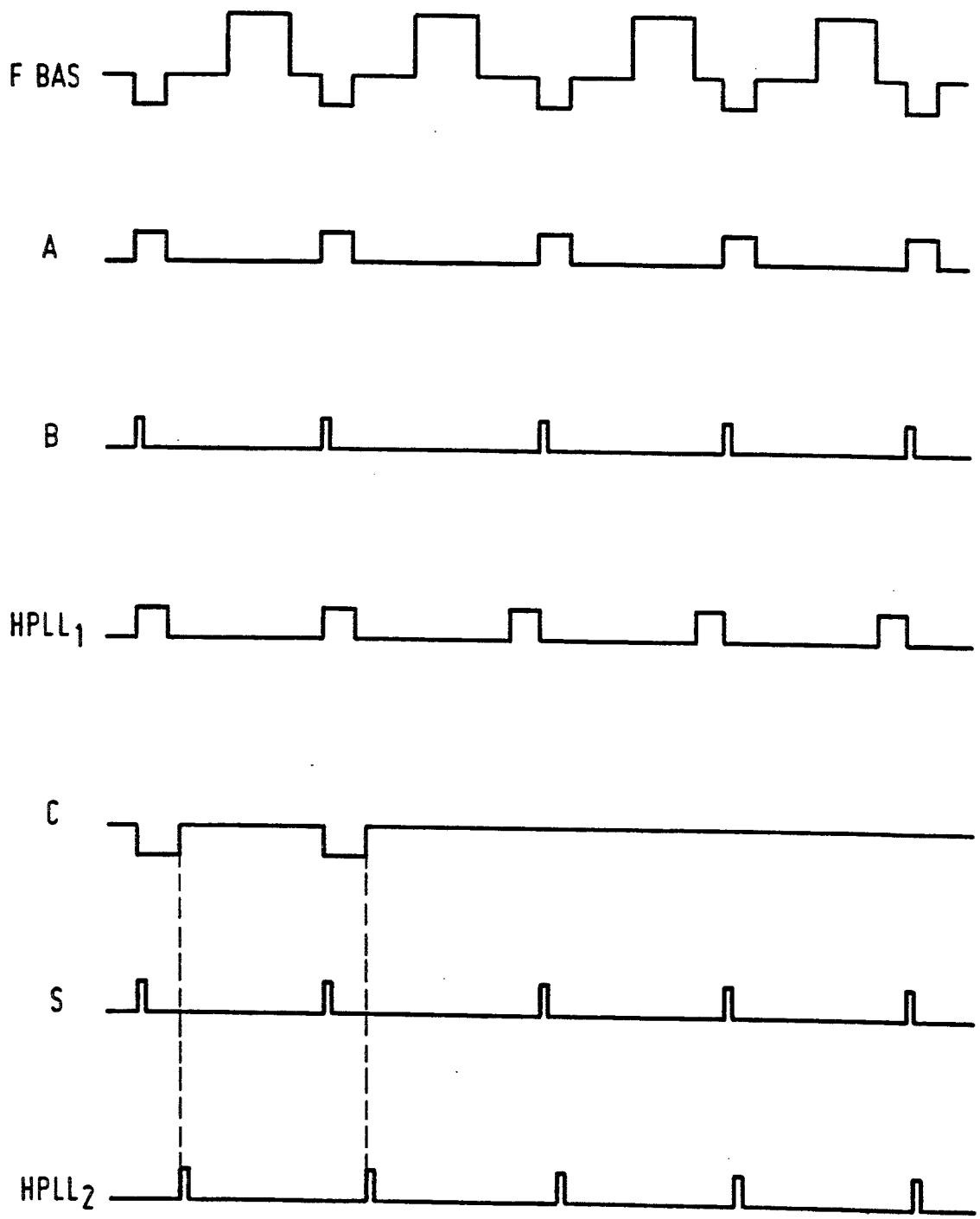
FIG. 3 is a further pulse diagram of the synchronizing arrangement for a television signal exhibiting a phase jump.

In the time interval shown in FIG. 3 the processes in the first and second blanking intervals are identical to the process in the first blanking interval of the time interval shown in FIG. 2, because the FBAS television signal is undisturbed in these time intervals. However, a phase jump occurs at the start of the third blanking interval shown in FIG. 3. The result of this phase jump is that the horizontal sync pulse in accordance with characteristic curve B occurs after the pulse of the first switching signal $HPLL_1$ in this blanking interval. In the circuit shown in FIG. 1 this results in the AND gate 11 being inhibited, i.e. the horizontal sync pulse does not cause the RS flip-flop 14 to be reset. The output 15 of the RS flip-flop 14 and hence also the input 16 of the first AND gate 6 consequently have a constant high level. This in turn has the result that the horizontal sync pulses, which reach the first input 5 of the AND gate 6, also appear at the output 17 of the AND gate 6 and thus are passed on to the register 19 and the phase-locked loop 22. These processes are clearly visible in the example shown in FIG. 3. The output signal C of the RS flip-flop 14 remains at a high level in the third blanking interval (and also in the next two blanking intervals shown in the Figure). As a result, the output signal of the register 19, which is applied to the phase-locked loop 22, conveys a pulse S because this pulse is not blocked in the AND gate 6.

The pulse diagram of FIG. 3 thus shows that in spite of the phase jump occurring in the third blanking interval the horizontal sync pulse occurring in this blanking interval is passed on to the register 19 and the phase-locked loop 22. This reaction to phase jumps of the FBAS signal is particularly advantageous for displaying non-standard picture signals such as are often supplied, for example, by video recorders.

We claim:

1. A digital synchronizing arrangement for a picture display device comprising: a synchronizing signal separator stage in which horizontal sync pulses are derived from a digital television signal applied to the synchronizing arrangement and which television signal includes a horizontal synchronizing signal, and a phase-locked loop to which the horizontal sync pulses are applied for its synchronization, wherein the phase-locked loop generates each time a first switching signal comprising a pulse of a given pulse width at the expected instants of the horizontal sync pulses and further generates each time a pulse of a second switching signal at a predetermined time interval after each pulse of the first switching signal, and means for coupling a first horizontal sync pulse which occurs during said pulse of the first switching signal to the phase-locked loop, whereas horizontal sync pulses subsequently occurring until the next pulse of the second switching signal are not coupled to the phase-locked loop, and wherein all horizontal sync pulses subsequently occurring until the next pulse of the first switching signal are coupled to the phase-locked loop if no horizontal sync pulse were to occur during the pulse of the first switching signal.

2. A digital synchronizing arrangement as claimed in claim 1 wherein the coupling means comprises; a first AND gate having a first input to which the horizontal sync pulses are applied, a second AND gate having a first input to which the horizontal sync pulses are applied and whose second input receives the first switching signal and whose output is connected to a reset input of an RS flip-flop whose set input receives the second switching signal and whose output is connected to a second input of the first AND gate, and means for applying an output signal of the first AND gate to the phase-locked loop.

3. A digital synchronizing arrangement as claimed in claim 2, wherein said coupling means further comprises first and second registers with the first input of the second AND gate and the input of the phase-locked loop preceded by said first and second registers, respectively, each of which registers are clocked with a scanning clock of the television signal.

4. A digital synchronizing arrangement as claimed in any one of claims 1 to 3, wherein the first and second switching signals are generated by means of a counter arranged in a phase comparator of the phase-locked loop, which counter is clocked with scanning clocks of the television signal and is synchronized to the horizontal sync pulses in the synchronized state of the phase-locked loop.

5. A digital synchronizing arrangement as claimed in claims 2 or 3, wherein the horizontal pulses derived in the synchronizing signal separator stage are applied to a slope detector before they are further processed.

6. A digital synchronizing circuit for a picture display device comprising:
an input terminal for supplying to the synchronizing circuit a video signal containing horizontal synchronizing pulses,
a synchronizing signal separator stage coupled to said input terminal for deriving said horizontal synchronizing pulses from the video signal,
a phase-locked loop adapted to be synchronized by the horizontal synchronizing pulses, said phase-locked loop deriving, in response to received horizontal synchronizing pulses, a first switching signal of a given width at expected instants of receipt of the horizontal synchronizing pulses and a second switching signal with a predetermined time delay relative to the first switching signal, and
a gate circuit coupled between an output of the synchronizing signal separator stage and an input of the phase-locked loop and controlled by said first and second switching signals so that a first horizontal synchronizing pulse which occurs during the first switching signal is passed through the gate circuit to the input of the phase-locked loop, whereas horizontal synchronizing pulses which appear subsequent to said first horizontal synchronizing pulse, up until the second switching signal occurs, do not pass through the gate circuit, and if no horizontal synchronizing pulse appears during the first switching signal, all horizontal synchronizing pulses which occur subsequent to the first switching signal until the next occurrence of the first switching signal are passed through the gate circuit to the input of the phase-locked loop.

7. A digital synchronizing circuit as claimed in claim 6 wherein said gate circuit comprises:
a first AND gate having a first input coupled to the output of the synchronizing signal separator stage to receive the horizontal synchronizing pulses and having a second input,
a logic circuit controlled jointly by the horizontal synchronizing pulses at the output of the synchronizing signal separator stage and said first and second switching signals derived in the phase-locked loop, and
means coupling an output of the logic circuit to said second input of the first AND gate to control the operation thereof.

8. A digital synchronizing circuit as claimed in claim 7 wherein in normal operation said logic circuit produces at its output a pulse-type signal having a leading edge substantially coincident with a leading edge of said first switching signal.

9. A digital synchronizing circuit as claimed in claim 8 wherein the width of said pulse-type signal is determined by said predetermined time delay.

10. A digital synchronizing circuit as claimed in claim 6 further comprising means responsive to said horizontal synchronizing pulses and said first and second switching signals for deriving for the gate circuit a control pulse whose width is determined by said predetermined time delay.

11. A digital synchronizing circuit as claimed in claim 7 wherein said logic circuit comprises:
a second AND gate having first and second inputs and an output,
a first time delay element coupled between the output of the synchronizing signal separator stage and the first input of the second AND gate,
a flip-flop having a first input coupled to the output of the second AND gate, a second input, and an output which constitutes said output of the logic circuit, and
wherein said first and second switching signals of the phase-locked loop are applied to the second input of the second AND gate and to the second input of the flip-flop, respectively.

12. A digital synchronizing circuit as claimed in claim 11 further comprising a second time delay element coupled between an output of the first AND gate and said input of the phase-locked loop.

13. A digital synchronizing circuit as claimed in claim 7 further comprising a slope detector coupled between the output of the synchronizing signal separator stage and the first input of the first AND gate.

* * * * *